United States Patent [19]

Suzuki

[11] Patent Number: 5,486,797
[45] Date of Patent: Jan. 23, 1996

[54] INTEGRATED PORT SELECTION CIRCUIT FOR HIGH FREQUENCY SIGNAL

[75] Inventor: Tomohiro Suzuki, Chiba, Japan

[73] Assignee: Uniden Corporation, Chiba, Japan

[21] Appl. No.: 337,816

[22] Filed: Nov. 8, 1994

[30] Foreign Application Priority Data

Aug. 4, 1994 [JP] Japan ................................ 6-183452

[51] Int. Cl.⁶ ..................................................... H01P 1/15
[52] U.S. Cl. ........................... 333/104; 333/205; 370/38; 455/83
[58] Field of Search ................................... 333/101, 103, 333/104, 205, 126, 134; 370/29, 30, 32, 57, 58.1, 38; 455/78–80, 82, 83

[56] References Cited

U.S. PATENT DOCUMENTS 5,023,935 6/1991 Vancraeynest ...................... 333/104 X
5,241,291 8/1993 Blackburn .......................... 333/205 X
5,387,886 2/1995 Takalo et al. ............................ 333/101

FOREIGN PATENT DOCUMENTS 5-19038  1/1993  Japan .
5-145410 6/1993  Japan .
5-183341 7/1993  Japan .

Primary Examiner—Paul Gensler
Attorney, Agent, or Firm—Fish & Richardson

[57] ABSTRACT

A port selection circuit in which a port selection section and a variable frequency filter are integrated on a substrate. The port selection circuit selectively connects any one of first to n-th ports to an (n+1)-th port and comprises first to n-th switches. Each of the switches includes one end connected to a corresponding one of the first to n-th ports and the other end connected to a common connecting point. When any one of the first to n-th ports is selected, a variable frequency filter connected between the common connecting point and the (n+1)-th port is set to a frequency characteristic for transmitting the frequency assigned to the selected port.

8 Claims, 7 Drawing Sheets

INTEGRATED PORT SELECTION CIRCUIT FOR HIGH FREQUENCY SIGNAL

BACKGROUND OF THE INVENTION

1. Field of the Invention

The present invention relates to a port selection circuit for a high frequency signal, such as a transmission/reception switching circuit, which can be incorporated into an integrated circuit by utilizing a strip line technique and can also be applied to a time division multiplex apparatus and a frequency multiplex apparatus. Disclosure Document No. 357467 regarding the present invention has been accepted by the U.S. Patent and Trademark Office.

2. Description of the Prior Art

As an example of a port selection circuit, there is known a transmission/reception switching circuit which selects one of a transmitting port connected to the output of a transmitting section and a receiving port connected to the input of a receiving section, thereby connecting the selected port to an antenna port. For instance, currently used digital mobile telecommunication terminals employ different frequencies for transmission and reception signals (for example, digital cellular) or the same frequency for transmission and reception signals (for example, digital cordless phone). In any digital mobile telecommunication terminal mentioned above, a transmission/reception switching circuit is constituted by combining a transmission/reception switch (or duplexer), a transmission bandpass filter and a reception bandpass filter.

FIG. 1 is a block diagram schematically illustrating the constitution of a high frequency circuit of a conventional digital cellular. As shown in this figure, the high frequency circuit of the digital cellular comprises a transmitting section TX, a receiving section RX, a transmission/reception switch (or duplexer) TRS and an antenna port AP connected to an antenna. The transmitting section TX comprises a modulator 100 for producing a signal of a predetermined transmitting frequency by modulating an IQ signal supplied, a power amplifier 102 for power- amplifying the modulated IQ signal and a transmitting bandpass filter 104 for extracting a signal of a predetermined transmitting frequency band from the power-amplified signal. Meanwhile, the receiving section RX comprises a receiving bandpass filter 106 for extracting a signal of a predetermined receiving frequency band from a received signal supplied from the transmission/reception switch TRS, a pre-amplifier 108 for amplifying the output of the bandpass filter 106 and a demodulator 110 for demodulating the amplified received signal to an IQ signal.

In the case of a digital cordless phone, since a transmitting frequency is the same as a receiving frequency, it is possible to incorporate or integrate a transmission/reception switch, a transmitting bandpass filter and a receiving bandpass filter. However, in the case of a digital cellular, since a transmitting frequency is different from a receiving frequency, it is difficult to incorporate or integrate a transmission/reception switch, a transmitting bandpass filter and a receiving bandpass filter. Therefore, such a digital cellular must be constituted with discrete parts, resulting in such a disadvantage that the high frequency circuit thereof occupies a large physical area.

SUMMARY OF THE INVENTION

The present invention has been proposed to overcome the disadvantage described above, and it is therefore an object of the present invention to provide a port selection circuit for a high frequency signal which can integrate a port selecting section such as a transmission/reception switch and a filter by introducing a strip line technique and which can be applied to a variety of apparatuses, more specifically, to provide any one of 2:1, 3:1, . . . and n:1 port selection circuits.

In order to achieve the object described above, the present invention provides a port selection circuit for selectively connecting any one of first to n-th ports (n: an integer larger than 1) to an (n+1)-th port. Said circuit comprises:

first to n-th switches each including one end connected to a corresponding one of the first to n-th ports and the other end connected to a common junction point; and a variable frequency filter which is connected between the common junction point and the (n+1)-th port and is set to such a frequency characteristic as allows a frequency assigned to the selected port to pass in response to the selection of one of the first to n-th ports. The switches and the variable frequency filter can be integrated on a substrate by means of a strip line technique.

When n=2, the first switch is a first diode a first electrode of which is connected to the first port, and the second switch comprises (a) a strip line having a length equal to ¼ of the waveform of a frequency assigned to the first port and including one end connected to a second electrode of the first diode and the other end connected to the second port and (b) a second diode connected between the other end of the strip line and the earth. Either the first port or the second port is selected by controlling the conduction of the first diode and the second diode.

When n=2, the first switch comprises a first strip line having a length equal to ¼ of the waveform of a frequency assigned to the second port and including one end connected to the first port and a first diode connected between the one end of the first strip line and the earth, and the second switch comprises (a) a second strip line having a length equal to ¼ of the waveform of a frequency assigned to the first port and including one end connected to the other end of the first strip line and the other end connected to the second port and (b) a second diode connected between the other end of the second strip line and the earth. Either the first port or the second port can be selected by controlling the conduction of the first diode and the second diode.

When n=2, a transmission/reception switching circuit can be constituted by using the first port as a receiving port, the second port as a transmitting port and the third port as an antenna port and selecting the first port by turning ON the first diode and the second diode and selecting the second port by turning OFF the first diode and the second diode.

When n=3, the first switch comprises (a) a first strip line having a length equal to ¼ of the wavelength of the lowest frequency of the frequencies assigned to the first to the third ports and including one end connected to the first port and the other end connected to the common junction point and (b) a first diode group connected between the first strip line and the earth at positions where an impedance viewed from the common junction point toward the first port becomes infinite at frequencies assigned to the second and the third ports, the second switch comprises (a) a second strip line having a length equal to ¼ of the wavelength of the lowest frequency of the frequencies assigned to the first to third ports and including one end connected to the second port and the other end connected to the common junction point and (b) a second diode group connected between the second strip line and the earth at positions where an impedance viewed from the common junction point toward the second port becomes infinite at frequencies assigned to the first and the third ports, and the third switch comprises (a) a third strip line having a length equal to ¼ of the wavelength of the lowest frequency of the frequencies assigned to the first to the third ports and including one end connected to the third port and the other end connected to the common junction point and (b) a third diode group connected between the third strip line and the earth at positions where an impedance viewed from the common junction point toward the third port becomes infinite at frequencies assigned to the first and second ports. Any one of the first to third ports is selected by controlling the conduction of the diodes in the first to third diode groups.

In general, each of the first to the n-th switches comprises:

(a) a strip line having a length equal to at least ¼ of the wavelength of the lowest frequency of the assigned frequencies and including one end connected to a corresponding one of the first to n-th ports and the other end connected to the junction point; and (b) a diode group connected to the strip line at positions separated from the common junction point by distances equal to ¼ of the wavelength of frequencies excluding the frequency assigned to the port connected with the strip line, whereby any one of the first to n-th ports is selected by controlling the conduction of respective diodes of the diode groups.

In the present invention, any one of the first to n-th switches is activated and the port connected to the activated switch is selected, whereby a frequency characteristic of a variable frequency filter is set so that the frequency assigned to the selected port is allowed to pass. Accordingly, transmission is carried out with a predetermined frequency between the selected port and the (n+1)-th port.

The present invention, constituted as described above, can provide a novel port selection circuit in which a port selecting section and a variable frequency filter are integrated and which can simultaneously select a port and set a frequency assigned to the selected port, whereby reduction in size and cost of the apparatus can be achieved by utilizing the port selection circuit of the present invention as a high frequency section of a frequency multiplex or time division multiplex apparatus and a digital mobile telecommunication terminal. Particularly, since the port selection circuit according to the present invention can be composed using strip lines and discrete parts, the present invention is advantageous in that high integration can be realized by applying the circuit of the present invention to a microwave monolithic IC (MMIC).

Moreover, the realization of the variable frequency filter by utilizing a strip line technique substantially eliminates any dispersion in characteristic of active elements, resulting in the improvement in overall yield and the achievement of circuits having uniform characteristics.

BRIEF DESCRIPTION OF THE DRAWINGS

FIG. 3A illustrates a circuit of the basic constitution of FIG. 2 embodied as an integrated transmission/reception switching circuit, while

Figure 1:
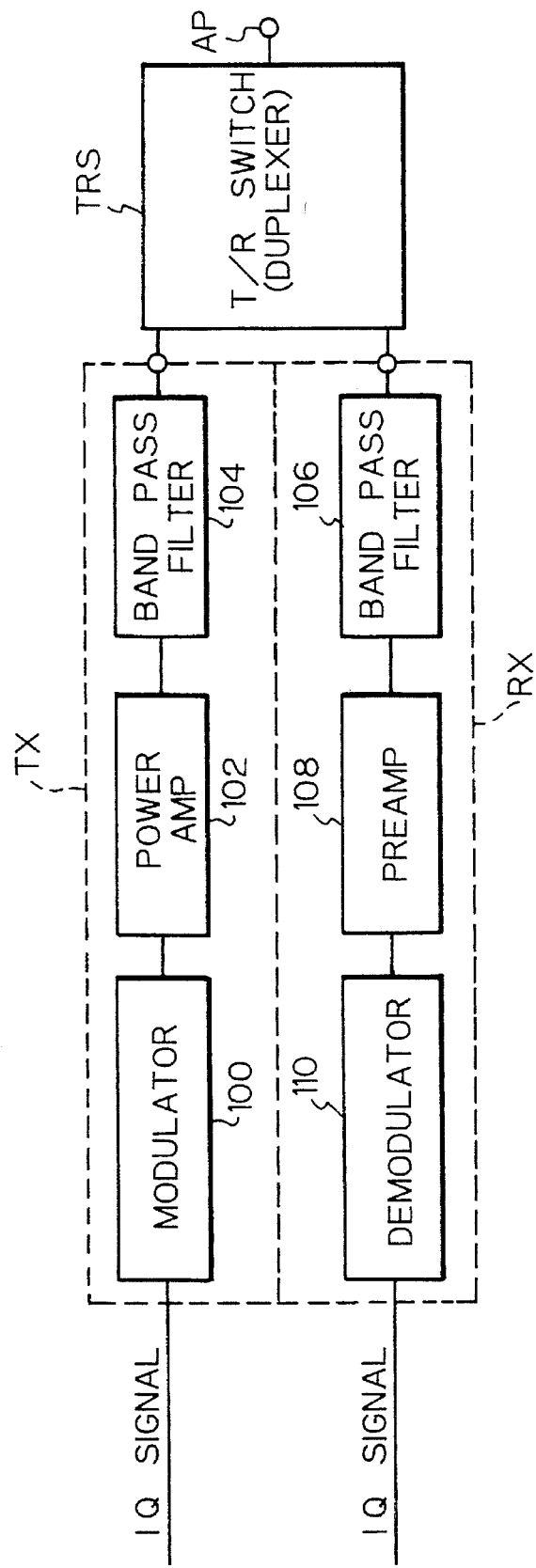
FIG. 1 schematically illustrates the constitution of a high frequency circuit of a digital cellular commercially available.
Figure 2:
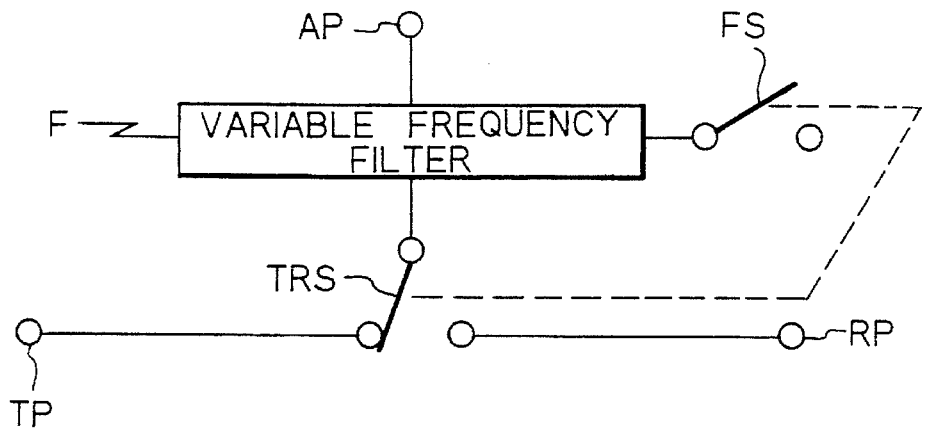
FIG. 2 illustrates a basic constitution of a port selection circuit for a high frequency signal according to the present invention embodied as a transmission/reception switching circuit.

DESCRIPTION OF THE PREFERRED EMBODIMENTS:

The preferred embodiments of the present invention will be explained hereunder in detail with reference to the accompanying drawings. FIG. 2 illustrates a basic constitution of a port selection circuit for a high frequency signal according to the present invention embodied as a transmission/reception switching circuit. This switching circuit may be thought as a 2:1 port selection circuit for selectively connecting either a transmitting port TP or a receiving port RP to an antenna port AP. In the circuit of FIG. 2, the switching of the transmitting port TP and the receiving port RP is carried out by a transmission/reception switch TRS. A variable frequency filter F is provided between the transmission/reception switch TRS and the antenna port AP and connected with a frequency switch FS which operates in conjunction with the operation of the transmission/reception switch TRS in order to change a frequency band of the filter F depending on whether the circuit is in a transmission or reception mode. When the transmission/reception switch TRS is set to the transmission side, the variable frequency filter F is set to allow a signal of a predetermined transmitting frequency to pass by the frequency switch FS in conjunction with the operation of the switch TRS and the transmitting signal applied to the transmitting port TP is sent to the antenna port AP as a signal having the transmitting frequency preset in the variable frequency filter F.

On the other hand, when the transmission/reception switch TRS is set to the reception side, the variable frequency filter F is set to permit a signal of a predetermined receiving frequency to pass by the frequency switch FS in conjunction with the operation of the switch TRS and the variable frequency filter F selects a signal of the present receiving frequency from a received signals sent from the antenna port AP and passes the signal to the receiving port RP.

The transmission/reception switch TRS, the variable frequency filter F and the frequency switch FS of the switch circuit illustrated in FIG. 2 may be constituted as an integrated circuit by employing circuit elements such as strip lines. Some embodiments of the port selection circuit integrated by utilizing a strip line technique will then be explained with reference to the accompanying drawings.

Figure 3A:
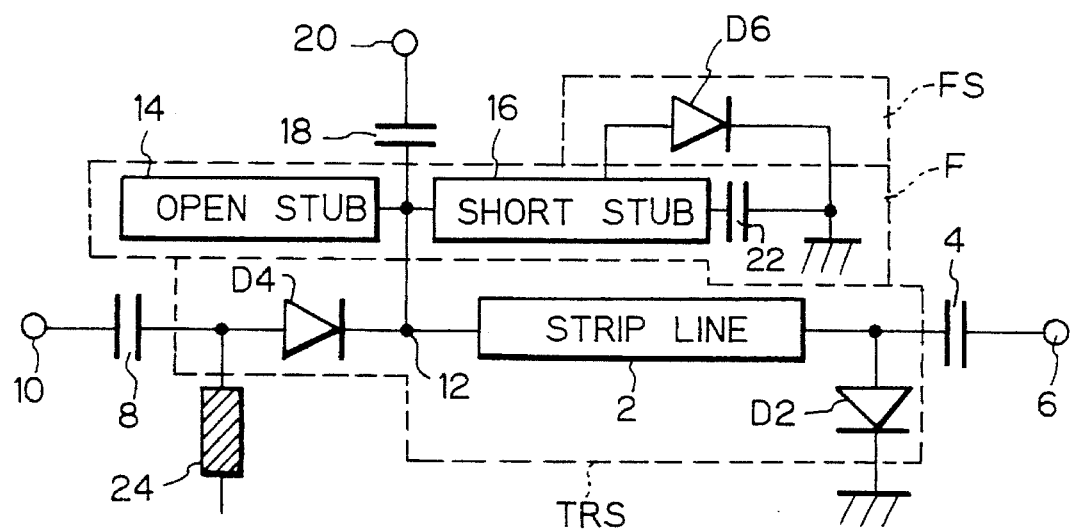

FIG. 3A schematically illustrates the constitution of an embodiment of the port selection circuit for a high frequency signal according to the present invention, that is, a practical constitution of the transmission/reception switching circuit of FIG. 2 integrated on a substrate. In this figure, the transmission/reception switch TRS comprises a strip line 2 of a length equal to ¼ of the wavelength $\lambda_R$ of a receiving frequency and a couple of diodes D2, D4. One end of the strip line 2 and the anode of the first diode D2 are connected to a transmission port 6 via a capacitor 4, while the cathode of the diode D2 is grounded. The other end of the strip line 2 is connected to the cathode of the second diode D4, while the anode of the diode D4 is connected to a reception port 10 via a capacitor 8.

The junction point of the other end of the strip line 2 and the cathode of the diode D4 is connected to the variable frequency filter F comprising an open stub 14 and a short stub 16. Specifically, opposing end portions of the open stub 14 and the short stub 16 of the variable frequency filter F are connected to the junction point 12 and to an antenna port 20 via a capacitor 18. The other end of the short stub 16 is grounded via a capacitor 22. The anode of a third diode D6 which functions as the frequency switch FS is connected to an appropriate position (explained later) between both ends of the short stub 16 and the cathode of the diode D3 is grounded.

The first to third diodes D2, D4, and D6 are turned OFF during the transmission mode to show an infinite impedance and are turned ON during the reception mode to show a zero impedance. In order to control the diodes D2 to D6 as explained above, a negative voltage −V is applied during the transmission mode via a high frequency choke 24 to the junction point of the anode of the second diode D4 and the capacitor 8, while a positive voltage+V during the reception mode.

Figure 4A:
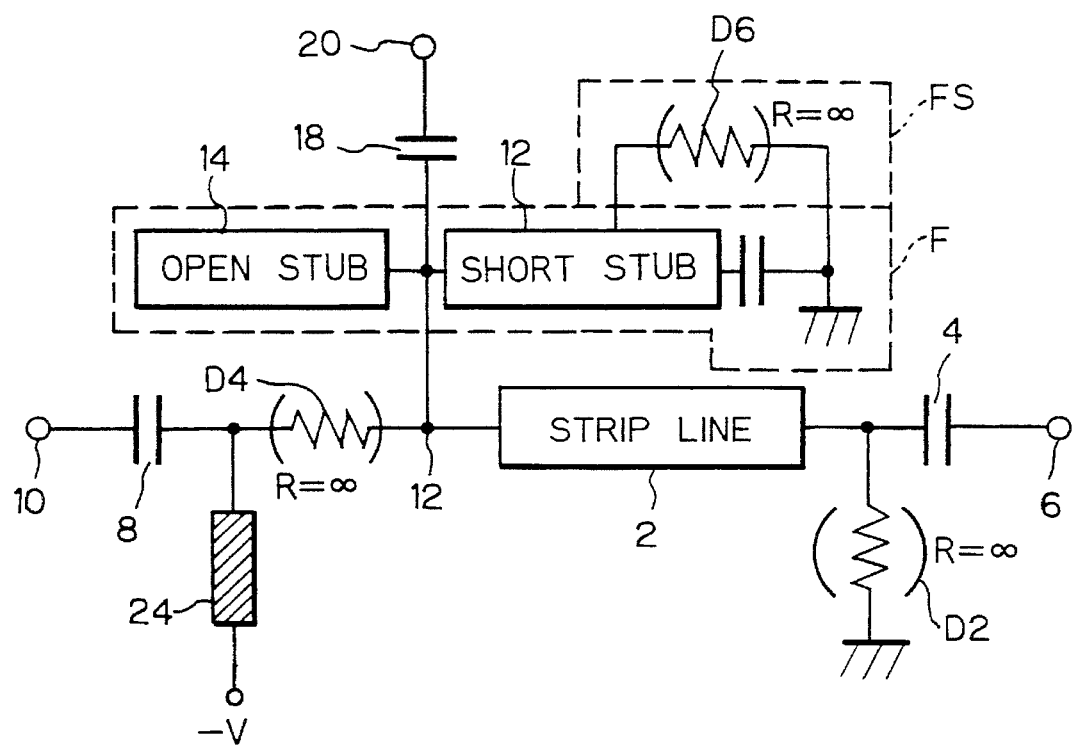
FIG. 4A is used to explain a transmitting operation of transmission/reception switching circuit of FIG. 3A.
Figure 4B:
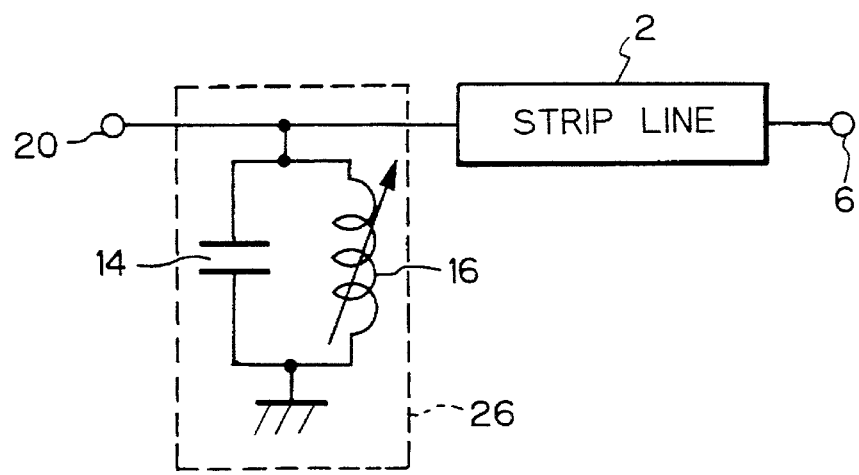
FIG. 4B shows an equivalent circuit thereof.

Next, operations of the transmission/reception switching circuit illustrating in FIG. 3A will be explained with reference to FIGS. 4A, 4B and 5A, 5B. FIG. 4A illustrates a circuit connection when the transmission/reception switching circuit is in the transmission mode (the first to third diodes D2 to D6 are turned OFF showing an infinitive impedance), while FIG. 4B illustrates an equivalent circuit of the transmission/reception switching circuit in the transmission mode shown in FIG. 4A. As explained above, since the first to third diodes D2 to D6 are turned OFF to show an infinite impedance, the full length of the short stub 16 is operated to show an inductive impedance. On the other hand, since the open stub 14 has a length to show a capacitive impedance at the transmitting frequency, a combination of the capacitive impedance of the open stub 14 and the inductive impedance of the short stub 16 form a bandpass filter 26 which allows the transmitting frequency to pass. Since the impedance of the ¼$\lambda_R$ length strip line 2 does not give any influence on the transmitted signal and the impedance of the first and second diodes D2, D4 is infinite, a signal applied to the transmitting port 6 is sent to the antenna port 20 without any leakage to the receiving section. Since the bandpass filter 26 is inserted between the transmitting port 6 and the antenna port 20, a frequency spectrum can be suppressed from extending during transmission.

Figure 5A:
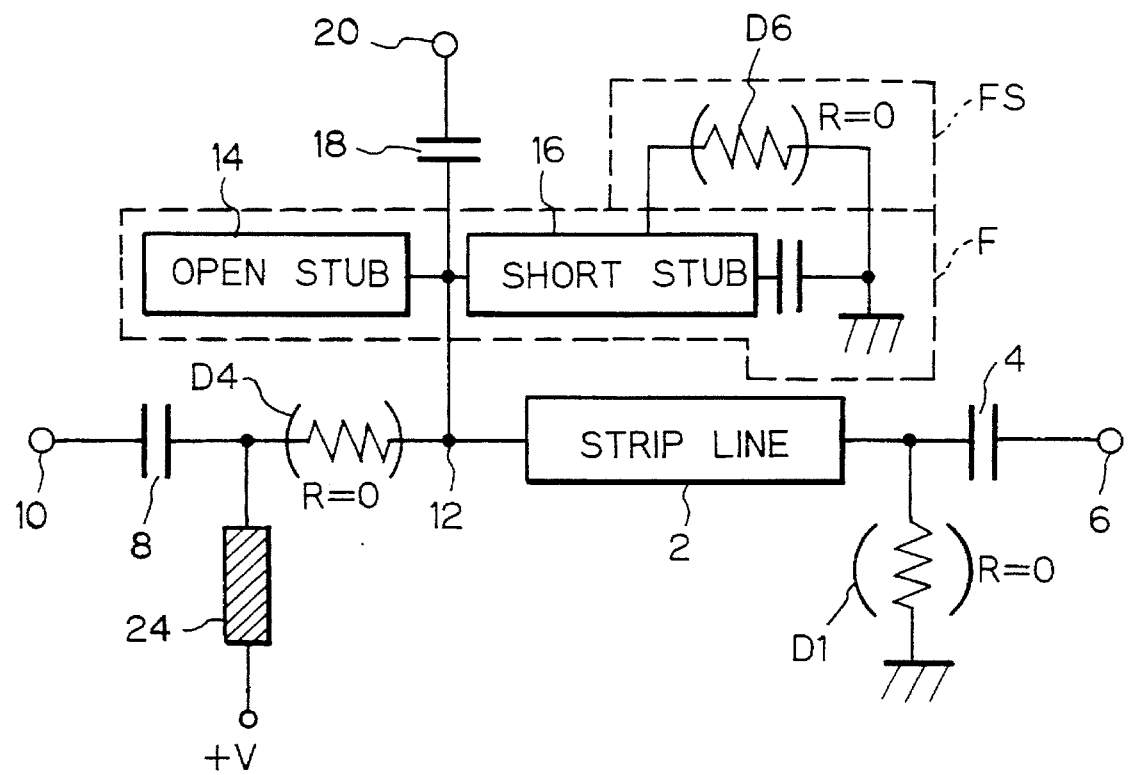
FIG. 5A is used to explain a receiving operation of transmission/reception switching circuit of FIG. 3A.
Figure 5B:
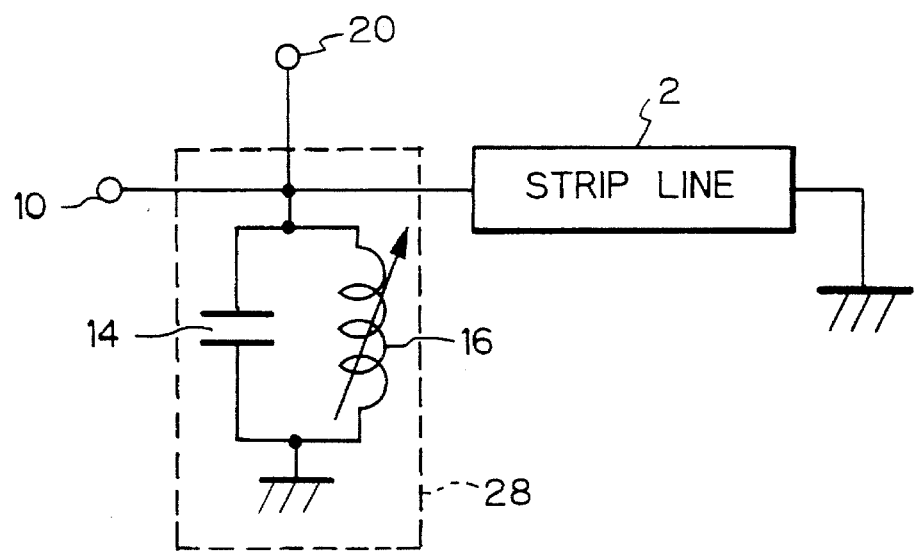
FIG. 5B shows an equivalent circuit thereof.

FIG. 5A illustrates a circuit connection when the transmission/reception switching circuit of FIG. 3A is in the reception mode (the first to third diodes D2 to D6 are turned ON showing a zero impedance), while FIG. 5B illustrates an equivalent circuit of the circuit in the reception mode shown in FIG. 5A. Since the impedance of the first to third diodes D2 to D6 is zero, a portion of the short stub 16 is grounded through the third diode D6 and the remaining portion thereof shows an inductive impedance. Further, the open stub 14 has a length to show a capacitive impedance at the receiving frequency. Consequently, a combination of the capacitive impedance of the open stub 14 and the inductive impedance of the short stub 16 form a bandpass filter 28 which allows the receiving frequency to pass. In the receiving mode, since one end of the ¼$\lambda_R$ length strip line 2 is grounded through the first diode D2, the impedance viewed from the junction point 12 toward the transmitting port 6 becomes infinitive at the receiving frequency and therefore no received signal leaks to the transmitting section.

In the transmission/reception switching circuit shown in FIG. 3A, a single variable frequency filter is used, but a plurality of variable frequency filter may be provided between the antenna port 20 and the junction point 12 depending on how wide a transmitting frequency bandwidth and a receiving frequency bandwidth are.

Figure 6:
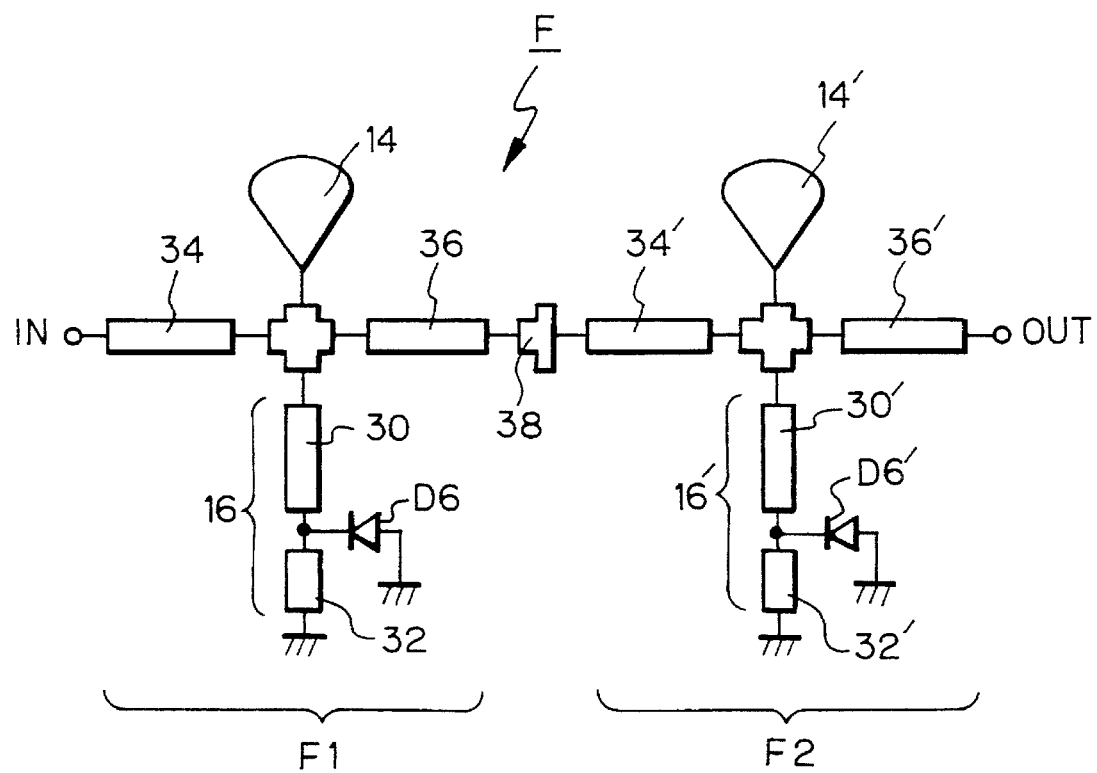
FIG. 6 illustrates a practical example of the variable frequency filter of FIG. 3A.

FIG. 6 illustrates a practical example of the variable frequency filter F of FIG. 3A which comprises filter stages F1, F2 formed on an alumina substrate. In the filter stage F1, the open stub 14 is formed in the shape of sector having a length of 8.3 mm and an opening angle of 35 degrees. The short stub 16 comprises a first line portion 30 which is 8 mm long and 7 mm wide and a second line portion 32 which is 5 mm long and 8 mm wide and connected in parallel with the third diode D6. The diode D6 has a junction capacitance 1 pF, a series resistance of 1 Ω when it is ON or 10 kΩ when it is OFF and a series inductance of 1 nH. A junction point of the open stub 14 and the first line portion 30 is connected to a signal input terminal IN of the variable frequency filter F by means of a line 34 which is 5 mm long and 0.1 mm wide and to a line converting portion 38 for converting a line width from 0.25 mm to 0.1 mm via a line 36 which is 5 mm long and 0.25 mm wide. Since the filter stage F2 has the same shape as the filter stage F1, a detailed explanation thereof will be omitted here. The constitutional elements of the filter stage F2 corresponding to those of the filter stage F1 are designated by the same reference numerals with apostrophe ('). The line 36' is connected to a signal output terminal OUT of the variable frequency filter F.

Figure 7A:
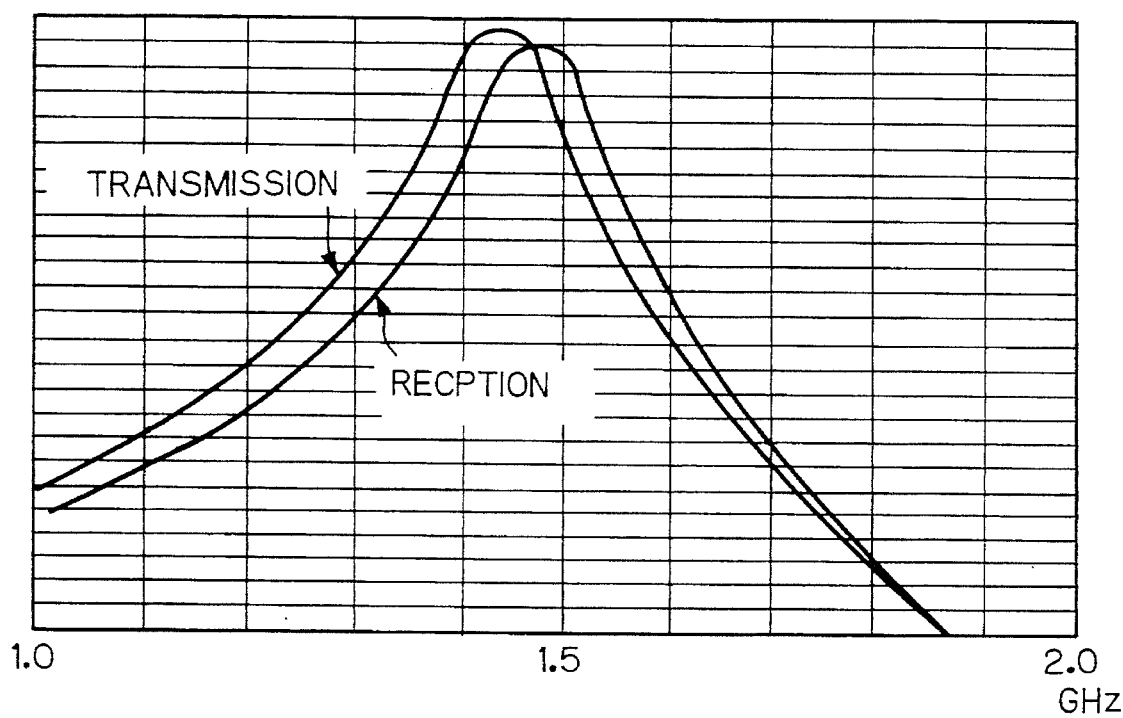
FIG. 7A shows frequency characteristics of the variable frequency filter of FIG. 6.
Figure 7B:
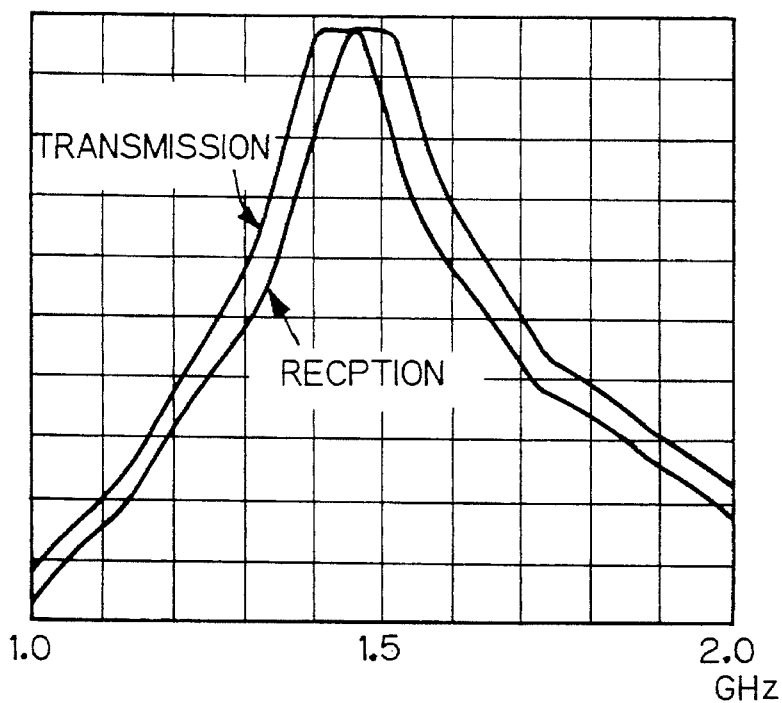
FIG. 7B shows frequency characteristics of a filter commercially available.

FIG. 7A is a graph showing of frequency characteristics of the variable frequency filter F illustrated in FIG. 6 measured in transmission and reception modes 1 GHz to 2 GHz. For reference, frequency characteristics of a filter commercially available are shown in FIG. 7B. These graphs teach that the variable frequency filter of FIG. 6 has a characteristic similar to that of the commercially available filter. A larger attenuation can be realized by increasing the number of filter stages modifying the constitution thereof.

In the switching circuit shown in FIG. 3A, it is necessary that an impedance viewed from the connecting point 12 toward the receiving port 10 becomes infinite in the transmission mode and that the receiving port 10 is connected in direct to the junction point 12 in the receiving mode. It is possible, therefore, to modify the circuit constitution shown in FIG. 3A to that illustrated in FIG. 3B. More specifically, a circuit comprising a strip line 2' having a length equal to ¼ of the wavelength $\lambda_T$ of a transmitting frequency and a diode D4' is provided between the junction point 12 and the capacitor 8 and the diodes D2, D4', D6 can be controlled to turn ON and OFF during the transmission and reception modes by applying a positive or negative voltage thereto through high frequency chokes 24', 24".

Figure 3B:
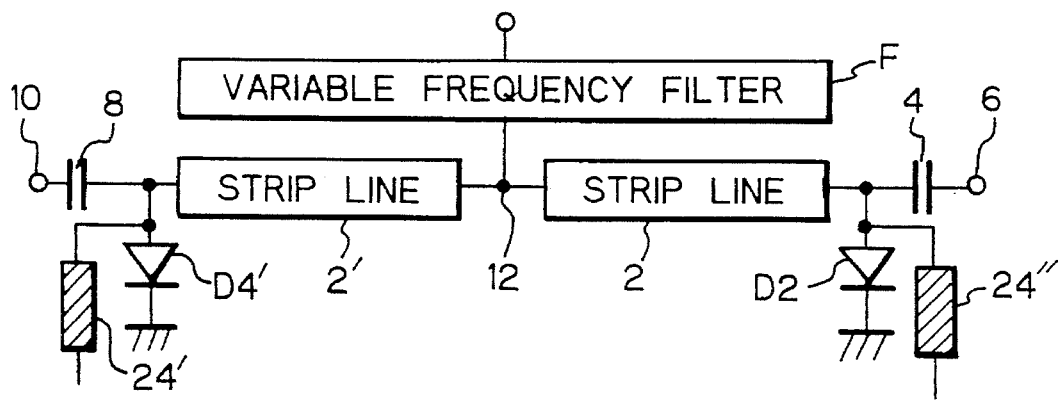
FIG. 3B illustrates a partly modified circuit of the transmission/reception switching circuit shown in FIG. 3A.

The transmission/reception switch TRS of the transmission/reception switching circuit shown in FIGS. 3A, 3B can be considered as a port selection means for switching either one of the two ports (transmitting port and receiving port) to one port (antenna port), that is, for executing 2:1 port selection. It is appreciated that the switching circuit of FIGS. 3A, 3B can be extended to a general port selection circuit for selectively connecting any one of n ports to one port, that is, for executing n:1 selective connection.

Figure 8:
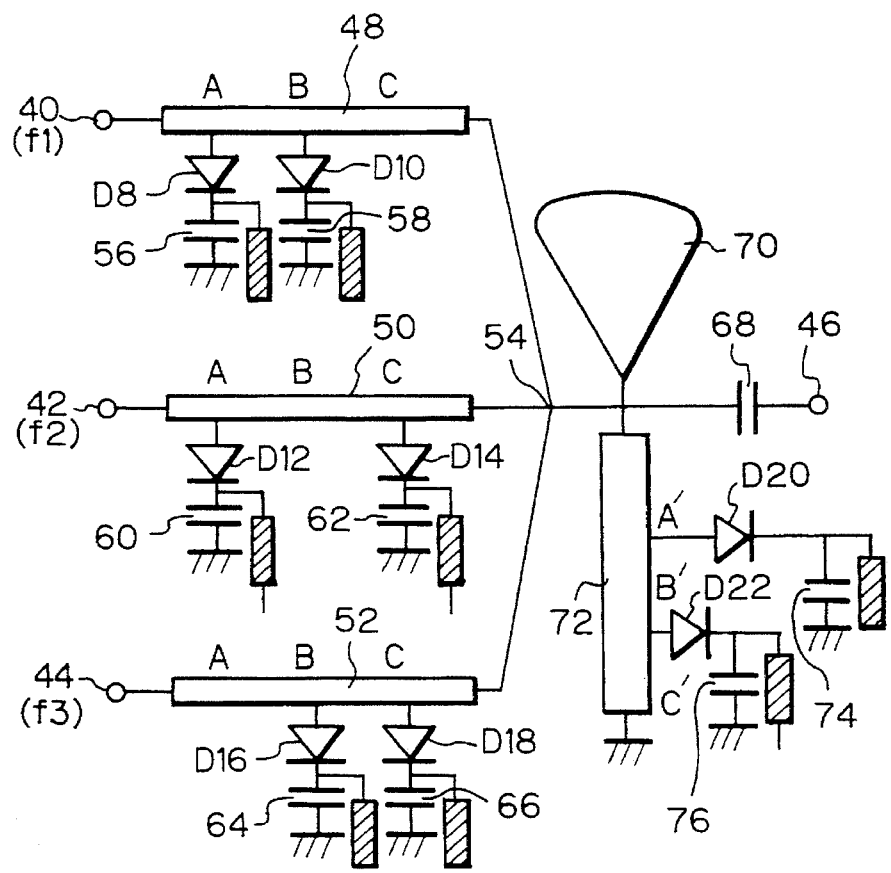
FIG. 8 illustrates a circuit constitution of the port selection circuit according to the present invention realized as an integrated 3:1 port selection circuit.

FIG. 8 schematically illustrates the constitution of another embodiment of a port selection circuit for a high frequency signal according to the present invention proposed on the basis of the finding described above. This port selection circuit operates to select any one of a first port 40 to which a frequency f1 is assigned, a second port 42 to which a frequency f2 is assigned and a third port 44 to which a frequency f3 is assigned and connect the selected port to a fourth port 46. Assume that f1>f2>f3. Ends of the strip lines 48, 50, 52 which have a length equal to or a little longer than ¼ of the wavelength of the lowest frequency f3 are respectively connected to the first to third ports 40, 42, 44 and the other ends of these strip lines are connected to a junction point 54.

The signs A, B, C given to the strip lines 48, 50, 52 respectively indicate the positions corresponding to ¼ of the wavelengths of the frequencies f3, f2, f1 from the junction point 54. To the positions A, B of the strip line 48, the anodes of diodes D8, D10 are respectively connected and the cathodes thereof are grounded via corresponding capacitors 56, 58; to the positions A, C of the strip line 50, the anodes of the diodes D12, D14 are respectively connected and the cathodes thereof are grounded via corresponding capacitors 60, 62; and to the positions B, C of the strip line 52, the anodes of the diodes D16, D18 are respectively connected and the cathodes thereof are grounded via corresponding capacitors 64, 66. A positive or negative control voltage for controlling these diodes to turn ON and OFF is applied through a high frequency choke to the points between the cathodes of the diodes D8 to D18 and the corresponding capacitors 56 to 66.

The junction point 54 is connected to the fourth port 46 via a capacitor 68 and to opposing ends of an open stub 70 and a short stub 72. The length of short stub 72 is determined to constitute a bandpass filter for transmitting the frequency f3 in combination with the open stub 70. The anode of a diode D20 is connected to a position A' of the short stub 72, while the cathode of the diode D20 is grounded via a capacitor 74 whereby the short stub 72 constitutes a bandpass filter for transmitting the frequency f1 in combination with the open stub 70. Similarly, the of a diode D22 is connected to a position B' of the short stub 72, while the cathode of the diode 22 is grounded via a capacitor 76 whereby the short stub 72 constitutes a bandpass filter for transmitting the frequency f2 in combination with the open stub 70. To junction points between the cathodes of the diodes D20, D22 and the capacitors 74, 76, a positive or negative control voltage is applied via high frequency chokes for controlling these diodes to turn ON and OFF.

Operations of the port selection circuit of FIG. 8 will be explained. For the purpose of selecting the first port 40 and then transmitting a signal of frequency f1 between the first port 40 and the fourth port 46, positive and negative control voltages are adequately applied to turn ON the diodes D14, D18 connected to the strip lines 50, 52 and the diode D20 connected to the short stub 72 and turn OFF the remaining diodes. As a result, an impedance viewed from the junction point 54 toward the second and third ports 42, 44 becomes infinite and the signal of frequency f1 never passes to the ports 42, 44 through the strip lines 50, 52. Further, since the diode D20 is turned ON, the short stub 72 in combination with the open stub 70 constitutes a bandpass filter for transmitting the frequency f1.

For the purpose of transmitting a signal of frequency f2 between the second port 42 and the fourth port 46, the diodes D10, D16 respectively connected to the strip lines 48, 52 and the diode D22 connected to the short stub 72 are turned ON, while the remaining diodes are turned OFF. As a result, an impedance viewed from the junction point 54 toward the first and third ports 40, 44 becomes infinite and the signal of frequency f2 never passes to the first and third ports 40, 44 via the strip lines 48, 52. Further, since the diode D22 is turned ON, the short stub 72 in combination with the open stub 70 constitutes a bandpass filter for transmitting the frequency f2.

Similarly, in order to transmit a signal of frequency f3 between the third port 44 and fourth port 46, the diodes D8, D12 respectively connected to the strip lines 48, 50 turned ON, while the remaining diodes are turned OFF. As a result, an impedance viewed from the junction point 54 toward the first and second ports 40, 42 being infinite, none of the signal of frequency f3 is sent to the ports 40, 42 via the strip lines 48, 50 and the full length the short stub 72 in combination with the open stub 70 constitutes a bandpass filter for transmitting the frequency f3.

The port selection circuit of FIG. 8 is suitable for a time division multiplex apparatus because it operates to connect any one of the first to third ports 40, 42, 44 to the fourth port 46 at any time when required by selectively turning ON and OFF the eight diodes D8 to D22 as explained above.

Figure 9:
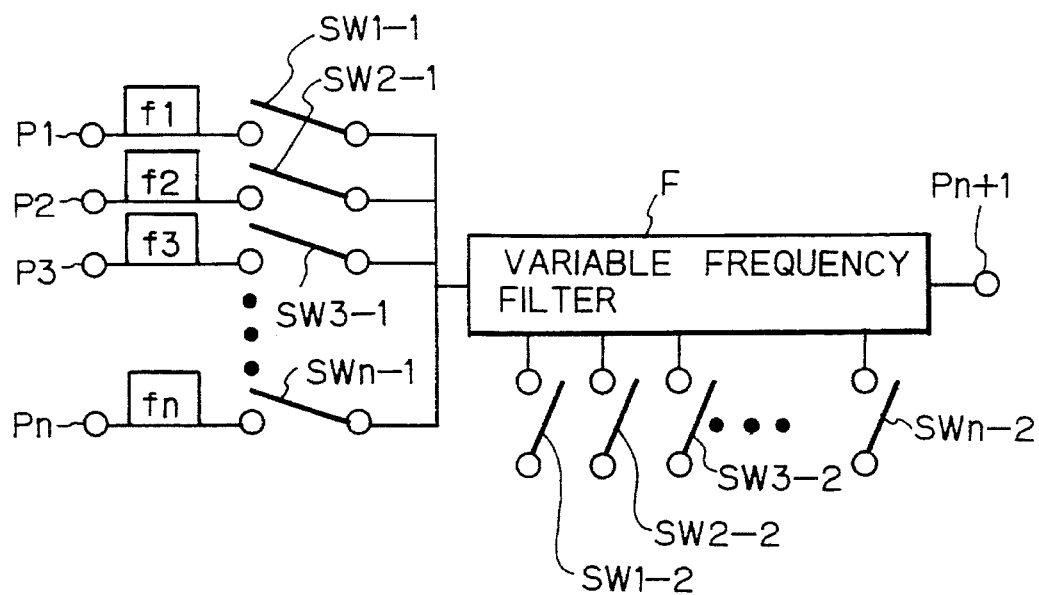
FIG. 9 illustrates a basic constitution of the port selection circuit according to the present invention realized as an n:1 port selection circuit.

In the port selection circuit of FIG. 8, the strip line 48 and the diodes D8, D10 constitute a first switch for selecting the first port 40, the strip line 50 and the diodes D12, D14 constitute a second switch for selecting the second port 42 and the strip line 52 and the diodes D16, D18 constitute a third switch for selecting the third port 44. The diode D20 can be considered as a switch which turns 0N in conjunction with the first switch turning ON and the diode D22 as a switch which turns ON in conjunction with the second switch turning ON. The concept of such 3:1 port selection can generally be extended to n:1 port selection. FIG. 9 schematically illustrates a circuit of the present invention which is embodied as an n:1 port selection circuit. This n:1 port selection circuit performs selective connection between any one of first to n-th ports P1, P2, P3, . . . , Pn and an (n+1)-th port $P_{n+1}$. The first to n-th ports are respectively assigned to frequencies f1, f2, f3, . . . , fn and these frequencies are transmitted between the respective ports and the (n+1)-th port $P_{n+1}$. The first to n-th ports P1 to Pn are connected to one terminal of the variable frequency filter F via corresponding n first switches SW1-1, SW2-1, SW3-1, . . . , SWn-1, while the other terminal of the variable frequency filter F is connected to the (n+1)-th port $P_{n+1}$. The variable frequency filter F is connected with second switches SW1-2, SW2-2, SW3-2, . . . , SWn-2 respectively corresponding to the first switches SW1-1, SW2-1, . . . , SWn-1. When any one of the first switches SW1-1, SW2-1, . . . , SWn-1 is closed and one of the ports P1– pn is selected, one of the second switches SW1-2, SW2-2, SW3-2, . . . , SWn-2 is closed in accordance with which of the ports has been selected.

Accordingly, the variable frequency filter F is set to have a frequency characteristic by which a signal of the frequency assigned to the port selected by a closed one of the first switches can be transmitted.

The port selection circuit of FIG. 9 enables one-way or two-way signal transmission to be realized on a time division basis between the (n+1)-th port $P_{n+1}$ and the first to n-th ports P1 to Pn by assigning time slots to the first to n-th ports p1 to Pn, i.e., to the frequencies f1, f2, f3, . . . , fn and closing one of the first switches and one of the second switches corresponding thereto during the assigned time slot.

Some preferred embodiments of a port selection circuit for a high frequency signal according to the present invention have been explained, but it will be understood that variations and modifications can be effected within the spirit and scope of the invention. For example, frequencies used in such embodiments may be different with each other, the same, or partly different and partly the same. When the same frequency is used, in the embodiment shown in FIGS. 3A, 3B, the diode D6 is unnecessary and the length of the short stub 16 is determined to constitute a bandpass filter for transmitting the frequency in combination with the open stub 14; and in the embodiment shown in FIG. 8, the diodes D20, D22 are unnecessary, the length of the short stub 72 is determined to constitute a bandpass filter for transmitting the frequency in combination with the open stub 70 and the diodes D8 to D18 may be replaced with a diode connected between a position separated from the junction point 54 by a length equal to ¼ of the frequency and the earth.

What is claimed is:

1. A port selection circuit for selectively connecting any one of first to n-th ports to an (n+1)-th port, where n is an integer larger than 1, first to n-th frequencies respectively assigned to said first to n-th ports being different from each other, said circuit comprising:

first to n-th switches each including one end connected to a corresponding one of said first to n-th ports and the other end connected to a common junction point;

a variable frequency filter which is connected between said common junction point and said (n+1)-th port and is settable to a frequency characteristic permitting any one of said first to n-th frequencies to pass; and means responsive to the operation of any one of said first to n-th switches for causing said variable frequency filter to set to a frequency characteristic permitting a frequency assigned to the port corresponding to the operated switch to pass.

2. A port selection circuit according to claim 1, wherein;

n is equal to 2;

said first switch is a first diode a first electrode of which is connected to said first port;

said second switch comprises (a) a strip line having a length equal to ¼ of the wavelength of a frequency assigned to said first port and including one end connected to a second electrode of said first diode and the other end connected to said second port and (b) a second diode connected between said other end of said strip line and the earth; whereby either of said first port and said second port is selected by controlling the conduction of said first diode and second diode.

3. A port selection circuit according to claim 2, wherein;

said first port is a receiving port, said second port is a transmitting port and said third port is an antenna port; and said first port is selected by turning ON said first diode and said second diode, while said second port is selected by turning OFF said first diode and said second diode.

4. A port selection circuit according to claim 1, wherein;

n is equal to 2;

said first switch comprises a first strip line having a length equal to ¼ of the wavelength of a frequency assigned to said second port and including one end connected to said first port and a first diode connected to said one end of said strip line and the earth;

said second switch comprises (a) a second strip line having a length equal to ¼ of the wavelength of a frequency assigned to said first port and including one end connected to the other end of said first strip line and the other end connected to said second port and (b) a second diode connected between said other end of said second strip line and the earth; whereby either of said first port and second port is selected by controlling the conduction of said first diode and said second diode.

5. A port selection circuit according to claim 4, wherein;

said first port is a receiving port, said second port is a transmitting port and said third port is an antenna port; and said first port is selected by turning ON said first diode and said second diode, while said second port is selected by turning OFF said first diode and said second diode.

6. A port selection circuit according to claim 1, wherein;

n is equal to 3;

said first switch comprises (a) a first strip line having a length equal to ¼ of the lowest frequency of the frequencies assigned to said first to said third ports and including one end connected to said first port and the other end connected to said common junction point and (b) first diode group connected between said first strip line and the earth at positions where an impedance viewed from said common connecting point toward said first port becomes infinite at frequencies assigned to said second and said third ports;

said second switch comprises (a) a second strip line having a length equal to ¼ of the wavelength of the lowest frequency of the frequencies assigned to said first to said third ports and including one end connected to said second port and the other end connected to said common junction point and (b) a second diode group connected between said second strip line and the earth at positions where an impedance viewed from said common junction point toward said second port becomes infinite at frequencies assigned to said first and said third ports;

said third switch comprises (a) a third strip line having a length equal to ¼ of the wavelength of the lowest frequency of the frequencies assigned to said first to said third ports and including one end connected to said third port and the other end connected to said common junction point and (b) a third diode group connected between said third strip line and the earth at positions where an impedance viewed from said common junction point toward said third port becomes infinite at frequencies assigned to said first and said second ports; whereby any one of said first to said third ports is selected by respectively controlling the conduction of said first to said third diode groups.

7. A port selection circuit according to claim 1, wherein;

each of said first to n-th switches comprises (a) a strip line having a length equal to at least ¼ of the wavelength of the lowest frequency of said assigned frequencies and including one end connected to a corresponding one of said first to n-th ports and the other end connected to the junction point and (b) a diode group connected to said strip line at positions separated from said common junction point by distances equal to ¼ of the wavelength of frequencies excluding the frequency assigned to the port to which said strip line is connected;

whereby any one of said first to n-th ports is selected by controlling the conduction of respective diodes of said diode groups.

8. A port selection circuit comprising a port selection section for selecting any one of first to n-th ports (where n is an integer larger than 1) a variable frequency filter which is set to a frequency characteristic for transmitting a frequency assigned to the port selected by said port selection section and an (n+1)-th port for transmitting and receiving a signal to and from said variable frequency filter, thereby allowing a signal of a predetermined assigned frequency to be transmitted between the selected one of said n ports and said (n+1)-th port;

wherein said port selection section comprises (a) n strip lines having a length equal to at least ¼ of the lowest frequency of the assigned frequencies, each said strip line including one end connected to a corresponding one of said first to said n-th ports and the other end connected to said junction point, (b) diodes connected to said strip lines at positions separated from said junction point by distances equal to ¼ of the wavelength of frequencies excluding the frequency assigned to the port connected to each said strip line, and (c) a control voltage supplying section for turning ON said diodes connected at the positions separated from said junction point by the distance equal to ¼ of the wavelength of the frequency assigned to the port to be selected thereby connecting positions to the ground;

and wherein said variable frequency filter comprises (a) a stub member connected between said junction point and said (n+1)-th port and (b) diodes connected to said stub member corresponding respectively to said assigned frequencies, said diode corresponding to the frequency assigned to said selected port so that said stub being turned ON member constitutes a filter for transmitting the assigned frequency in response to the selection performed by said port selection section.

\* \* \* \* \*